United States Patent Office 3,632,513
Patented Jan. 4, 1972

3,632,513
CHEMICAL LAPPING OF YTTRIUM ALUMINUM
Frederick S. Kaveggia, South Laguna, Calif., assignor to
North American Rockwell Corporation
No Drawing. Filed May 23, 1969, Ser. No. 828,110
Int. Cl. B44c 1/22; C09k 3/00
U.S. Cl. 252—79.4       6 Claims

ABSTRACT OF THE DISCLOSURE

The solution used to chemically lap a yttrium aluminum garnet crystal to produce a damage free optically flat surface comprises a reducing organic acid, a dicarboxylic acid capable of forming a complex with yttrium, and an acid capable of forming an aluminum salt.

BACKGROUND OF THE INVENTION

(1) Field of the invention

The invention comprises a solution for chemically lapping a yttrium aluminum garnet surface and, more particularly, to such a solution including an acid group capable of forming aluminum salt.

(2) Description of prior art

It is often desirable to process samples of yttrium aluminum garnet into a desired configuration. Ordinarily, the samples are mechanically or chemically processed into a baic configuration and, thereafter, mechanically or chemically lapped to produce a relatively damage-free and optically flat surface. Such surfaces can be used in the production of memory storage cells and laser optics.

Hot phosphoric, fused sodium hydroxide, potassium hydroxide, and hot sulfuric acid have been used to chemically etch yttrium aluminum garnet. However, the surfaces resulting from lapping with those solutions have not been as smooth as required for normal uses. Mechanical lapping similarly does not produce a damage free smooth surface as is required. For example, surfaces mechanically or chemically etched, according to known techniques and solutions, include grooves, ridges, etc., and as a result, are not optically flat. Thereafter, when the garnet is used as a substrate for a thin film, the thin film is not optically flat; and, therefore, it is difficult to photoetch the film to a high resolution.

A solution is required in which the garnet surface can be chemically lapped to the required degree of flatness. The solution described herein can be used to produce a garnet substrate having the required characteristics.

SUMMARY OF THE INVENTION

Briefly, the invention comprises a solution for chemically lapping yttrium aluminum garnet comprising a reducing organic acid, such as formic acid, a dicarboxylic acid capable of forming a complex with yttrium such as oxalic acid, and an acid group which is capable of forming an aluminum salt such as vanadyl sulfate. In the preferred solution embodiment, a wetting agent is included.

Therefore, it is an object of this invention to provide an improved process for chemically lapping yttrium aluminum garnet.

It is another object of this invention to provide an improved chemical process for lapping yttrium aluminum garnet so that the resulting surface is damage free and optically flat.

Still a further object of this invention is to provide a solution comprising an organic acid, a dicarboxylic acid, and an acid group capable of forming an aluminum salt for chemically lapping yttrium aluminum garnet.

A still further object of the invention is to provide a solution used in a chemical lapping process which includes vanadyl sulfate for improved controlled etching of the garnet surface.

These and other objects of the invention will become more apparent when taken in connection with the following description of the preferred embodiment.

DESCRIPTION OF PREFERED EMBODIMENT

The solution, or oriented etchant, as it is often called for chemically lapping the yttrium aluminum garnet crystal surface in an aqueous solution comprises from 5 to 40% by weight of formic acid, from 20–60% by weight of oxalic acid, from 5–30% of vanadyl sulfate ($VOSO_4$) and from 0–30% by weight of water. In a non-aqueous solution, the water would be replaced by a carrier for dissolving the three other elements. Glycerol (30–60% by weight), or alcohol may be used instead of water. Glycerol is a natural lubricant and exhibits desirable characteristics when used in a chemical lapping solution. In addition, a highly fluorinated aliphatic hydrocarbon such as the perfluoro alkyl sulfonates sold under the trademark F.C. 95 by the Minnesota Mining and Manufacturing Corporation may be added to reduce the surface tension of the solution so that it removes material uniformly from the garnet surface. For example, the surface tension may be reduced from 85 dynes per centimeter to 15 dynes per centimeter by the wetting agent. In one embodiment, approximately 15–20 parts per million of the wetting agent can be added to the solution. The aqueous solution should be maintained at a temperature of between 80 and 95° C. for optimum results. The non-aqueous solution provides optimum results at temperatures of 40–50° C.

Although the invention is not limited to a specific means for applying the solution to the garnet surface, in one embodiment, the solution may be applied through a perforated graphite disc. The garnet crystal is placed on top of the disc and rotated as the solution is sprayed through the perforations to achieve uniform etching. A structure which can be used to apply the solution to the crystal is described and claimed in patent application entitled Chemical Lapping Method & Apparatus, Ser. No. 667,916, filed Sept. 15, 1967.

The following examples are included to illustrate specific uses of the solution in lapping yttrium aluminum garnet crystals.

EXAMPLE I glycerol—92 grams
formic acid—46 grams
oxalic acid—24 grams
vanadyl sulfate—10 grams
temperature—45° C.

EXAMPLE II formic acid—10% by weight
oxalic acid—40% by weight
water—20% by weight
vanadyl sulfate—30% by weight
temperature—85° C.

Both of the above solutions were used to lap garnet crystals. Sharper and relatively clearer surfaces resulted. As a result, the lapped crystals can easily be used for memory and laser optic applications.

I claim:

1. A solution for use in chemical lapping yttrium aluminum garnet comprising 5 to 40 percent by weight formic acid, 20 to 60 percent by weight oxalic acid, 5 to 30 percent by weight vanadyl sulfate and a solvent selected from the group consisting of 0 to 30% by weight of water and 30 to 60% by weight of glycerol provided that where water is 0 glycerol is present as the solvent.

2. A solution as described in claim 1 containing about 10 percent by weight formic acid, about 40 percent by weight oxalic acid, about 30 percent by weight vanadyl sulfate and about 20 percent by weight water.

3. A solution as described in claim 1 including approximately 15 to 20 parts per million of a highly fluorinated aliphatic hydrocarbon suitable for use with said solution as a wetting agent.

4. A method of chemical lapping of yttrium aluminum garnet comprising the steps of lapping yttrium aluminum garnet in the presence of a solution containing 5 to 40 percent by weight formic acid, 20 to 60 percent by weight oxalic acid, 5 to 30 percent by weight of vanadyl sulfate and a solvent selected from the group consisting of 0 to 30% by weight of water and 30 to 60% by weight of glycerol provided that where water is 0 glycerol is present as the solvent.

5. A method as described in claim 4 whereby said solution containing water as a solvent is maintained at a temperature of between 80 and 95° C.

6. A method as deschribed in claim 4 whereby the solution containing glycerol as a solvent is maintained at a temperature of 40 to 50° C.

References Cited

UNITED STATES PATENTS

| | | | |
|---|---|---|---|
| 3,138,485 | 6/1964 | Kaveggia et al. | 134—3 |
| 3,341,384 | 9/1967 | Alderuccio et al. | 252—79.4 |

OTHER REFERENCES

Soden et al.: "Etching Reagents for Oxides," Jour. Amer. Ceramic Soc., vol. 48 (10), p. 548, October 1965.

WILLIAM J. VAN BALEN, Primary Examiner

R. J. ROCHE, Assistant Examiner

U.S. Cl. X.R.

156—2.6